UNITED STATES PATENT OFFICE.

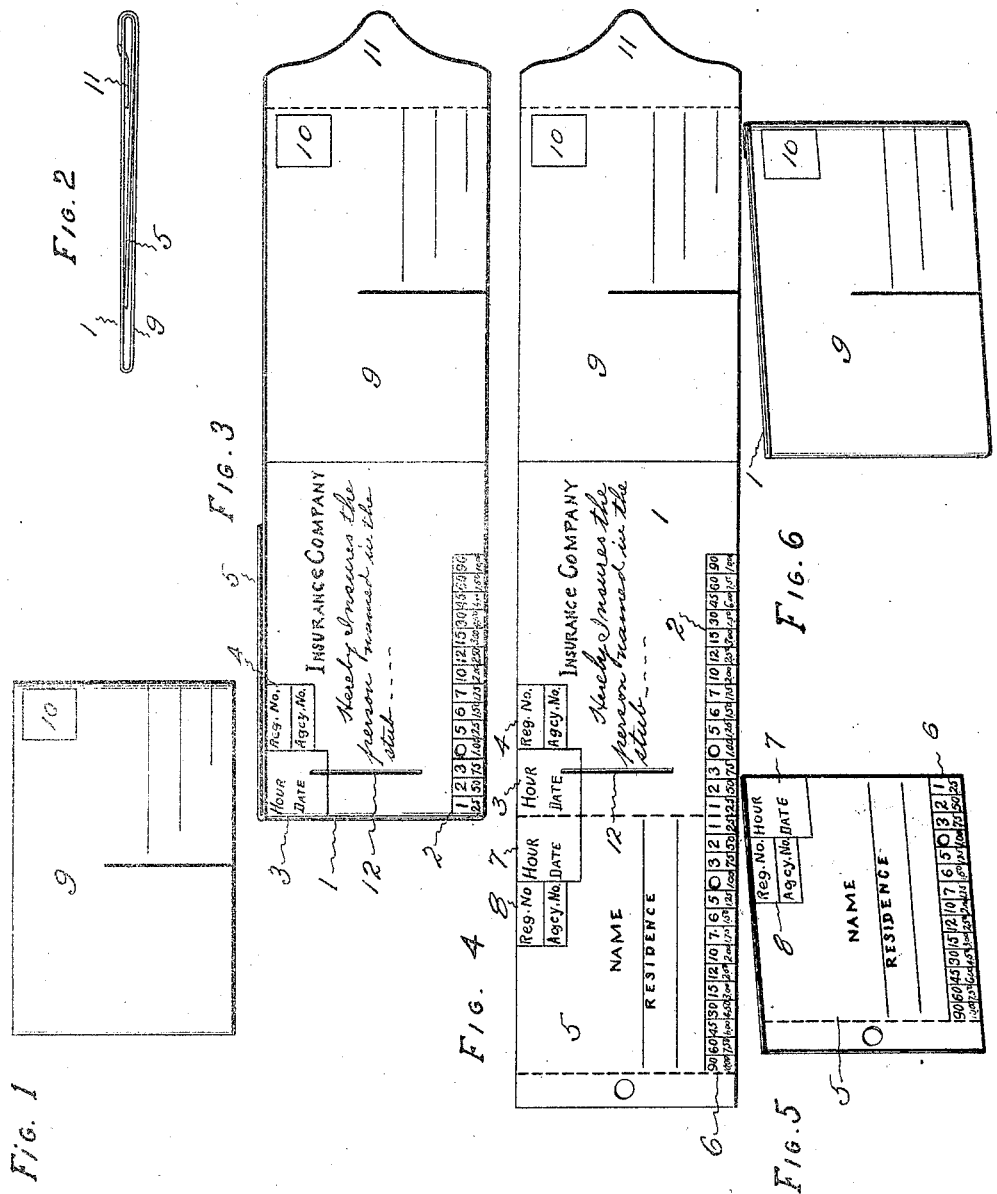

GEORGE S. PENFIELD, OF HARTFORD, CONNECTICUT, ASSIGNOR TO THE TRAVELERS INSURANCE COMPANY, OF HARTFORD, CONNECTICUT, A CORPORATION OF CONNECTICUT.

POST-CARD INSURANCE-POLICY.

1,000,623.   Specification of Letters Patent.   Patented Aug. 15, 1911.

Application filed January 24, 1910. Serial No. 539,893.

*To all whom it may concern:*

Be it known that I, GEORGE S. PENFIELD, a citizen of the United States, residing at Hartford, in the county of Hartford and State of Connecticut, have invented a new and useful Improvement in Post-Card Insurance-Policies, of which the following is a specification.

To facilitate the sale of accident, life, liability and similar insurance, particularly short term insurance, to travelers, tourists, and others, it is desirable to have policy blanks in such form that the contracts, including the terms and considerations, can be very quickly completed by agents of a company, and delivered to purchasers in suitable condition to be immediately mailed to the addresses of the insured, or beneficiaries or other interested parties.

The object of this invention is to provide a policy blank in the form of a folder, so arranged that an agent can very quickly indicate the special conditions of sale by simultaneously punching out or otherwise canceling the necessary figures on the contract card and corresponding figures on a stub, and then tear off the stub, in shape to be returned to the office of the company for record, and deliver the contract to the insured on a card that is in condition for mailing.

Figure 1 of the accompanying drawings shows a front view of a folder post card policy blank which embodies this invention. Fig. 2 is an edge view, showing the manner in which this card is folded. Fig. 3 shows the blank partly opened, the contract card and the stub being folded together as when the agent punches the term and consideration. Fig. 4 is a view of the blank entirely unfolded, showing the same term punched on both the contract card and on the stub. Fig. 5 shows the stub removed. Fig. 6 shows the contract card folded and ready for mailing after the stub has been torn or cut off.

The folder illustrated in the drawings, has a leaf 1, approximately the size of an ordinary post card, upon which is printed the conditions of the contract. Along one edge of this leaf, preferably the lower, are spaces 2, containing numerals representing certain term days, and figures indicating the cost of the insurance for the days noted in the same spaces. This leaf also has a space 3 for the hour and date when the insurance is issued, and spaces 4 for certain check numbers. Attached to one end of this contract leaf is a stub leaf 5, the line of attachment of the stub and the contract leaf being preferably scored so that the stub may be readily detached from the contract. On this stub leaf, along the lower edge, are spaces 6 containing numerals indicating the days of the term for which the insurance may be issued, and in the same spaces, figures showing the cost for the various terms. The numerals representing the term days on the contract leaf begin, at the end adjacent to the stub leaf, with 1 and run up, and the numerals on the stub leaf begin, at the end adjacent to the contract leaf, with 1 and run the other way. With this arrangement, when the stub is folded over against the back of the contract, as shown in Fig. 3, the numerals on the stub and contract will coincide so that when the term or duration of the policy is punched on the contract, the same term or duration will also be punched on the stub, as indicated in Fig. 4. The stub leaf is also preferably provided with lines for the name and residence of the insured, and with a space 7 for the hour and date when the insurance is issued, and with spaces 8 for check numbers corresponding with those on the contract leaf.

Attached to the end of the contract leaf, opposite from the stub, is a leaf 9. This leaf, which is of approximately the same size as the contract leaf, on one face has a space 10 for a postage stamp, and lines for the name and address of any person. This leaf also has a space upon which any message may be written, as is common with post cards. Attached to the free end of the address leaf is a tongue 11, which, when the card is folded, is designed to be tucked into the slot 12 made in the contract leaf. If all of the contract cannot be printed on the two faces of the contract leaf, it may be continued on the back of the address leaf.

These cards may be sent in blank by the company to the agent, either flat as shown in Fig. 4, or folded as shown in Fig. 2 of the drawings. The agent, on receiving a request for insurance, fills in the spaces provided on the contract and stub with the hour and date that the insurance is issued, by means of a stamp, or pen if he has no stamp, and fills in on the stub the name and residence of the insured. Then, when the stub is folded back against the contract sheet, as shown in Fig. 3, with a punch, knife or pen, cuts or otherwise marks the spaces containing the proper term or duration numerals and the cost figures. This, as stated, simultaneously cancels the same term on the contract leaf and the stub leaf. When this is done, the stub is torn from the contract and returned to the company, and the contract card, folded and fastened as shown in Fig. 6, is delivered to the purchaser of the insurance, who applies a stamp and his own address, or the address of any beneficiary or other person. The contract can then be deposited in the mail to be forwarded to the desired person, who will have it in his possession in case any accident, resulting in death or injury, happens to the insured.

Insurance cards arranged in this manner, can be very quickly filled out by an agent and delivered to the insured, who can, without any trouble, mail it at once to any desired address, while the agent has a convenient stub, which is returned to the company for future reference. In case of any controversy, cards punched as above described, can be immediately proved by placing the stub and the contract back to back, for the term perforations in the stub and in the contract will of necessity coincide, if the two are put together as they were when punched, and furthermore, the edges of the contract and the stub which are torn apart, must register.

The invention claimed is:

As a new article of manufacture, a folder for a post card insurance system having a sheet provided with a slot and printed with a contract of insurance and spaces containing numerals adapted to be punched for indicating the duration and cost of the insurance for various terms, a stub sheet attached to one end of said contract sheet, the line of junction between the contract sheet and the stub sheet being scored so that these sheets may be readily folded and easily separated, the said stub sheet being provided with spaces for the name and address of the insured and reversely arranged numerals indicating the duration and cost of the insurance for various terms, said numerals being so arranged that when these sheets are folded back to back and punched, similar term and cost numerals will be simultaneously canceled from each sheet, an address sheet attached to the end of the contract sheet opposite to the stub sheet and provided with spaces for a name, address and a postage stamp, and a tongue sheet attached to the free end of said address sheet, the line of junction between said address sheet and tongue sheet being scored so these may be readily folded and the tongue tucked into the slot in the contract sheet.

GEORGE S. PENFIELD.

Witnesses:
R. C. DICKENSON,
WALTER W. PRATT.